(12) United States Patent
Nishikawa (10) Patent No.: US 8,072,666 B2
(45) Date of Patent: Dec. 6, 2011

(54) OPTICAL SCANNING DEVICE, RETINAL SCANNING DISPLAY AND MANUFACTURING METHOD OF OPTICAL SCANNING DEVICE

(75) Inventor: Yasuo Nishikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 130 days.

(21) Appl. No.: 12/461,767

(22) Filed: Aug. 24, 2009

(65) Prior Publication Data

US 2010/0007935 A1    Jan. 14, 2010

Related U.S. Application Data

(63) Continuation-in-part of application No. PCT/JP2008/053234, filed on Feb. 26, 2008.

(30) Foreign Application Priority Data

Feb. 26, 2007  (JP) ................. 2007-046238

(51) Int. Cl.
*G02B 26/08* (2006.01)
(52) U.S. Cl. .................................... 359/201.2
(58) Field of Classification Search ............... 359/201.2, 359/223.1–226.1, 871, 872
See application file for complete search history.

(56) References Cited

U.S. PATENT DOCUMENTS

| 5,764,397 | A | 6/1998 | Inoue et al. |
| 6,275,626 | B1 | 8/2001 | Laor |
| 6,400,858 | B1 | 6/2002 | Laor |
| 6,574,388 | B2 | 6/2003 | Laor |
| 6,657,765 | B2 | 12/2003 | Hayashi et al. |
| 7,323,680 | B2 | 1/2008 | Chong |
| 2001/0051016 | A1 | 12/2001 | Laor |
| 2006/0255250 | A1 | 11/2006 | Chong |

FOREIGN PATENT DOCUMENTS

| JP | A-09-203875 | 8/1997 |
| JP | A-2000-221419 | 8/2000 |
| JP | A-2001-083446 | 3/2001 |
| JP | A-2002-277808 | 9/2002 |
| JP | A-2003-528332 | 9/2003 |
| JP | A-2005-181477 | 7/2005 |
| JP | A-2006-293054 | 10/2006 |
| WO | WO 00/25161 A1 | 5/2000 |
| WO | WO 2005/059624 A1 | 6/2005 |

OTHER PUBLICATIONS

Japanese Patent Office, Notification of Reason for Refusal mailed Sep. 6, 2011 in Japanese Patent Application No. 2007-046238 w/English-language Translation.

*Primary Examiner* — Euncha Cherry
(74) *Attorney, Agent, or Firm* — Oliff & Berridge, PLC (57) ABSTRACT

An optical scanning device includes an oscillating mirror portion having a reflection surface, and a frame portion holding the oscillating mirror portion. The optical scanning device reflects an incident optical flux by the reflection surface so as to convert the incident optical flux into a scanned optical flux. The optical scanning device further includes a reflection portion having a first reflection surface and a second reflection surface which are arranged in substantially V-shaped inclined surfaces. The first reflection surface reflects the incident optical flux and radiates the reflected light toward the oscillating mirror portion. The second reflection surface receives the reflected light from the oscillating mirror portion and radiates the reflected light as the scanned optical flux.

12 Claims, 9 Drawing Sheets

OPTICAL SCANNING DEVICE, RETINAL SCANNING DISPLAY AND MANUFACTURING METHOD OF OPTICAL SCANNING DEVICE

CROSS-REFERENCE TO RELATED APPLICATIONS

This application is a Continuation-in-Part of International Application PCT/JP2008/053234 filed on Feb. 26, 2008, which claims the benefit of Japanese Patent Application No. 2007-046238 filed on Feb. 26, 2007.

BACKGROUND

1. Field

The present invention relates to an optical scanning device which is used in a laser printer or a projection-type display device. The present invention particularly relates to an optical scanning device which scans a reflected light by swinging a reflection mirror mounted on an oscillator.

2. Description of the Related Art

Conventionally, in a projection-type display device or the like, there has been known an optical scanning device which forms a projection image by scanning laser beams modulated in response to an image signal. As an optical scanning part of this kind of optical scanning device, for example, a rotary multiple-face mirror (polygon mirror) or an oscillation-drive-type reflection mirror (Galvano mirror) has been used. In using the rotary multiple-face mirror, laser beams modulated in response to an image signal are radiated to the rotary multiple-face mirror which is rotated at a high speed, a reflected light of the laser beams is scanned, the scanned laser beams are radiated to a rotary drum on which a recording medium is formed thus writing a latent image, and the latent image is transferred to paper or the like. Further, in an image display device which uses the oscillation-drive-type reflection mirror, a mirror is oscillated at a high speed using a piezoelectric body, an electrostatic force or the like, laser beams which are modulated in response to an image signal are radiated to the oscillating mirror, a reflected light from the oscillating mirror is radiated to a screen or is directly radiated to a retina of a viewer thus forming an image. The oscillation-drive-type reflection mirror can miniaturize a drive part thereof compared to a drive part of the rotary-multiple-face mirror and hence, the oscillation-drive-type reflection mirror is suitable for realizing a light-weighted miniaturized optical scanning device.

Figure 10:
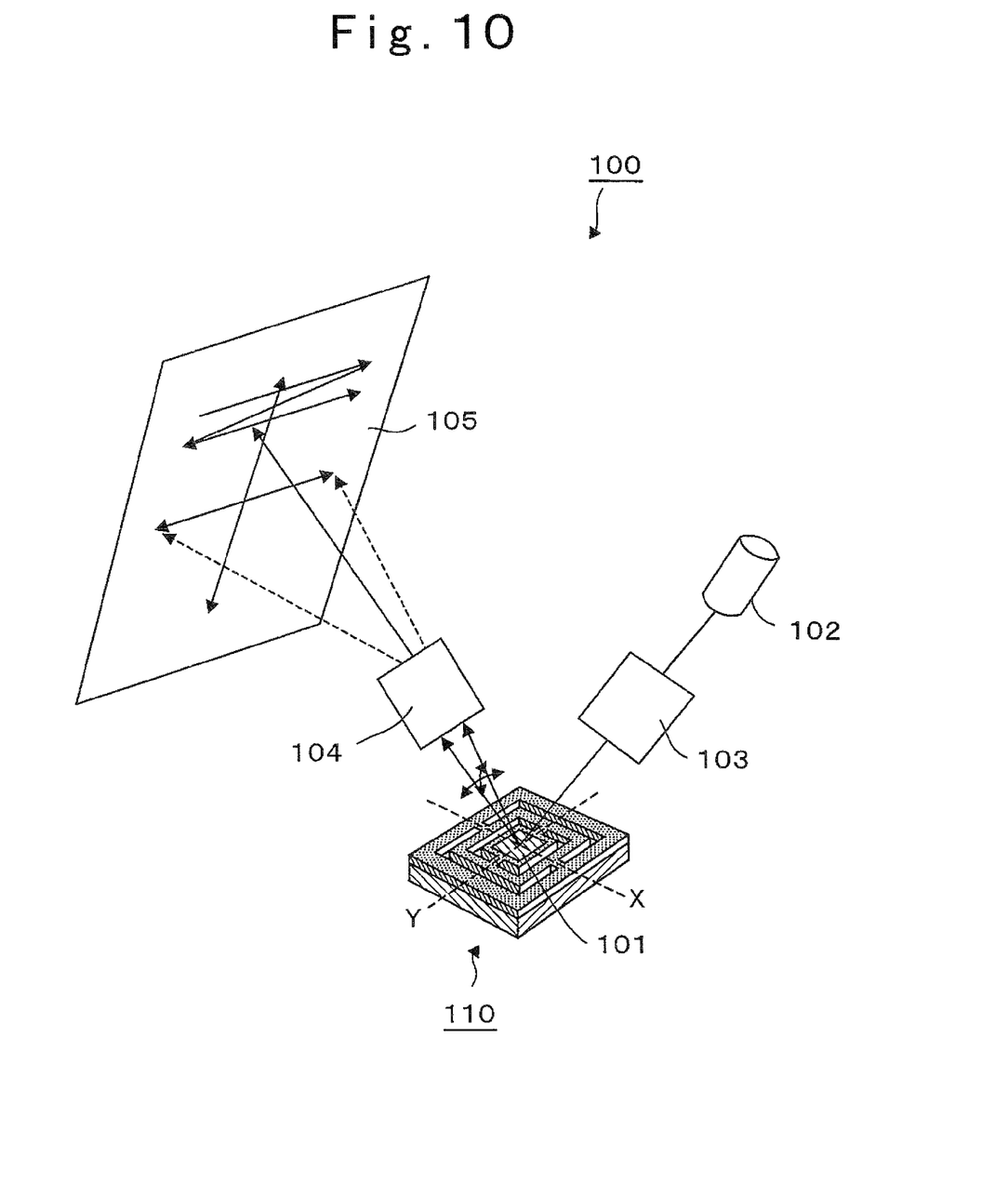
FIG. 10 is a conceptual view showing a projection image device using a conventionally known optical scanning device.

FIG. 10 is a conceptual view showing the constitution of a projection image device 100 which uses an optical scanning device 110 which adopts an oscillation-drive-type reflection mirror. A laser beam source 102 radiates an optical flux modulated in response to image data toward a focusing lens system 103. The focusing lens system 103 radiates the optical flux to an oscillating mirror 101 of the optical scanning device 110 as an approximately collimated or converged optical flux. The oscillating mirror 101 of the optical scanning device 110 swings about an X axis as well as about a Y axis. Due to such swinging of the oscillating mirror 101, the scanned optical flux reflected from the oscillating mirror 101 is scanned in the Y axis direction as well as in the X axis direction. The scanned optical flux is projected by a projection lens system 104 and an image is displayed on a screen 105. Here, the laser beam source 102, the focusing lens system 103, the projection lens system 104, and the screen 105 are arranged above the optical scanning device 110.

Further, in constituting an image forming device using an optical scanning device which adopts an oscillation-drive-type reflection mirror, there has been known an image forming device which acquires a large scanning angle by generating a multiple reflection between a movable mirror and a reflection surface. Particularly, there has been proposed an optical scanning device which integrally forms a reflection surface with and adjacent to a movable mirror of the optical scanning device (see JP-A-2002-277808 (patent document 1), for example). By integrally forming the movable mirror and the reflection surface, the number of parts can be decreased and, at the same time, assembling accuracy can be enhanced.

SUMMARY

As shown in FIG. 10, the optical scanning device 110 reflects an incident optical flux by the oscillating mirror and scans the reflected light. That is, the laser beams source, the focusing lens system which focuses the laser beams, and the projection lens system which scans and projects the reflected scanned optical flux are arranged on a front surface side of the optical scanning device. Accordingly, a limitation that the arrangement of these optical-system members becomes cumbersome is imposed on the optical scanning device 110. To obviate such a limitation, it may be possible to arrange a reflection mirror between the beam source or the focusing lens system and the optical scanning device or between the optical scanning device and the projection lens system. However, the addition of such an optical system as a new part increases the number of parts leading to the increase of the volume of the whole device and, at the same time, it is necessary to align the respective optical members with each other with high accuracy leading to the increase of a parts cost and the number of man-hours whereby a manufacturing cost is pushed up.

According to one aspect of the present invention, there is provided an optical scanning device which includes: an oscillating mirror portion which has an oscillatable reflection surface; a frame portion which holds the oscillating mirror portion; and at least one reflection portion which is arranged at a position where the reflection portion faces the reflection surface of the oscillating mirror portion, the reflection portion having a first reflection surface and a second reflection surface which form approximately V-shaped inclined surfaces, wherein the first reflection surface is configured to reflect an incident optical flux toward the oscillating mirror portion, and the second reflection surface is configured to receive a reflected light which is formed by reflection of the incident optical flux on the oscillating mirror portion and to radiate the reflected light as a scanned optical flux, whereby the incident optical flux is converted into the scanned optical flux by oscillations of the reflection surface.

According to another aspect of the present invention, there is provided a retinal scanning display which includes an optical scanning device and is configured to project and display an image on a retina by scanning an optical flux modulated in response to an image signal by the optical scanning device, wherein the optical scanning device includes: an oscillating mirror portion which has an oscillatable reflection surface; a frame portion which holds the oscillating mirror portion; and at least one reflection portion which is arranged at a position where the reflection portion faces the reflection surface of the oscillating mirror portion, the reflection portion having a first reflection surface and a second reflection surface which form approximately V-shaped inclined surfaces, wherein the first reflection surface is configured to reflect an incident optical flux toward the oscillating mirror portion, and the second reflection surface is configured to receive a reflected light which is formed by reflection of the incident optical flux on the oscillating mirror portion and to radiate the reflected light as a scanned optical flux, whereby the incident optical flux is converted into the scanned optical flux by oscillations of the reflection surface.

According to still another aspect of the present invention, there is provided a manufacturing method of an optical scanning device which includes: an oscillating mirror portion which has an oscillatable reflection surface; a frame portion which holds the oscillating mirror portion; and at least one reflection portion which is arranged at a position where the reflection portion faces the reflection surface of the oscillating mirror portion, the reflection portion having a first reflection surface and a second reflection surface which form approximately V-shaped inclined surfaces, wherein the manufacturing method of an optical scanning device includes a step of forming the reflection portion, and the step of forming the reflection portion includes the steps of: applying a resist to a semiconductor substrate; leaving the resist in a region where a peak portion or a skirt portion of the approximately V-shaped inclined surfaces is expected to be formed; forming the inclined surfaces in which the resist forms the peak portion or the skirt portion by applying anisotropic etching to the semiconductor substrate; and removing the resist.

DETAILED DESCRIPTION

An embodiment of the present invention is explained in detail hereinafter in conjunction with drawings.

Figure 1A:
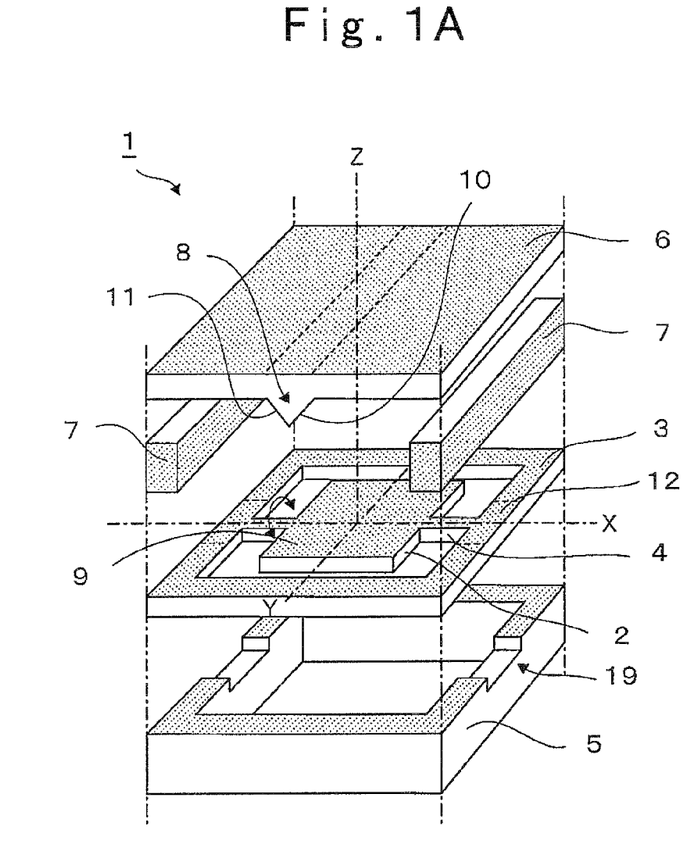
FIG. 1A is an exploded perspective view showing an optical scanning device according to an embodiment of the present invention.
Figure 1B:
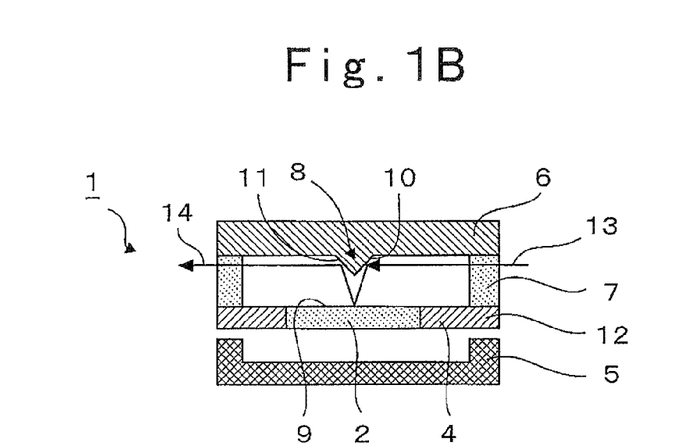
FIG. 1B is a longitudinal cross-sectional view of the optical scanning device shown in FIG. 1A.

FIG. 1A is an exploded perspective view showing an optical scanning device 1 according to an embodiment of the present invention, and FIG. 1B is a longitudinal cross-sectional view of the optical scanning device 1 taken along an X axis. In these drawings, identical parts or parts having identical functions are given same symbols.

As shown in FIG. 1A, the optical scanning device 1 includes: an oscillating mirror portion 2 which performs a swing motion; support portions 4 which constitute a swing axis (or an oscillation axis, the term being used in the same manner hereinafter) of the oscillating mirror portion 2; beam portions 12 which hold the support portions 4; a frame portion 3 which fixes the beam portions 12 (the frame portion 3 including the beam portions 12 as portions thereof as described later); a holding portion 5 which holds the frame portion 3 and forms a swing space therein; a reflection portion 6 which forms a V-shaped portion 8 constituted of a projecting portion having an approximately V-shaped cross section thereon and is arranged above the oscillating mirror portion 2; and light transmitting portions 7 which hold the reflection portion 6, forms a swing space for the oscillating mirror portion 2, receives an incident optical flux 13 and radiates a scanned optical flux 14. Further, a reflection surface 9 is formed on a surface of the oscillating mirror portion 2. On inclined surfaces of the V-shaped portion 8, a first reflection surface 10 for reflecting the incident optical flux 13 and a second reflection surface 11 for reflecting a scanned light reflected on the reflection surface 9 of the oscillating mirror portion 2 and for radiating the scanned optical flux 14 are formed.

In the above-mentioned optical scanning device 1, the oscillating mirror portion 2, the support portions 4, the beam portions 12 and the frame portion 3 are integrally formed. To be more specific, a semiconductor substrate is collectively formed through a photolithography step and an etching step. The frame portion 3 is fixedly mounted on an upper surface of a side wall of the holding portion 5 in a state that the frame portion 3 surrounds a periphery of the oscillating mirror portion 2. Stepped portions 19 are formed in the side wall of the holding portion 5, and regions of the frame portion 3 corresponding to the stepped portions 19 form the beam portions 12.

A piezoelectric body not shown in the drawing is fixedly adhered to a boundary between the beam portion 12 and the frame portion 3. By applying an AC voltage to the piezoelectric body so as to oscillate the piezoelectric body, the beam portion 12 is brought into torsional oscillation. The torsional oscillation of the beam portions 12 is transmitted to the support portions 4, and the oscillating mirror portion 2 performs a swing motion about a swing axis (X axis). Due to such an swing motion, the incident optical flux 13 reflected on the first reflection surface 10 is scanned and reflected, is reflected on the second reflection surface 11, and is radiated as the scanned optical flux 14. That is, the scanned optical flux 14 is radiated in a plane substantially equal to a plane which includes the incident optical flux 13 incident from the X axis direction.

By constituting the optical scanning device 1 in the above-mentioned manner, the incident optical flux 13 and the scanned optical flux 14 are arranged in approximately symmetry with respect to the optical scanning device 1 and hence, the present invention has an advantageous effect that it is possible to ensure the degree of freedom in designing a device in which the optical scanning device 1 is incorporated. Further, by integrally fixing the reflection portion 6 to the frame portion 3 which holds the oscillating mirror portion 2, the alignment of the optical system based on the incident optical flux and the optical system based on the scanned optical flux is facilitated and, at the same time, the optical scanning device 1 and a device which incorporates such an optical scanning device 1 therein can have the compact constitution.

In the above-mentioned embodiment, as described previously, the oscillating mirror portion 2, the support portions 4, the beam portions 12 and the frame portion 3 are integrally formed using a semiconductor substrate. The holding portion 5 and the light transmitting portions 7 are formed using a glass material. The oscillating mirror portion 2 may be formed using a metal material or the like besides the semiconductor substrate. Although explained in detail later, the reflection portion 6 can be formed by a semiconductor process using a semiconductor substrate. Alternatively, the reflection surface 9 of the oscillating mirror portion 2, and the first reflection surface 10 and the second reflection surface 11 of the reflection portion 6 are formed of a metal thin film made of aluminum, silver or the like.

Further, in the above-mentioned embodiment, the light transmitting portion 7 is arranged on an incident optical flux 13 side and a scanned optical flux 14 side. In place of such constitution, the light transmitting portion 7 may be arranged on V-shaped portion 8 sides of the reflection portion 6. Although the reflection portion 6 is integrally fixed to the frame portion 3 by way of the light transmitting portion 7, the reflection portion 6 may be mounted on another portion in a separate manner without being integrally fixed to the frame portion 3. Further, although the swinging of the oscillating mirror portion 2 is generated using piezoelectric bodies, the present invention is not limited to such piezoelectric bodies as a unit for generating the swinging of the oscillating mirror portion 2. That is, it is possible to adopt the constitution in which a magnet is arranged on the holding portion 5 below the oscillating mirror portion 2 or on a lower portion of the holding portion 5, a planar coil is formed on an upper surface or a back surface of the oscillating mirror portion 2, and an AC current is supplied to the coil so that the oscillating mirror portion 2 is swung by a magnetic force. Further, it may also possible to adopt the constitution in which an electrode is mounted on an inner bottom portion or inner wall surface of the holding portion 5 adjacent to the oscillating mirror portion 2, and an AC voltage is applied to the electrode so that the oscillating mirror portion 2 is swung by an electrostatic force.

Figure 2:
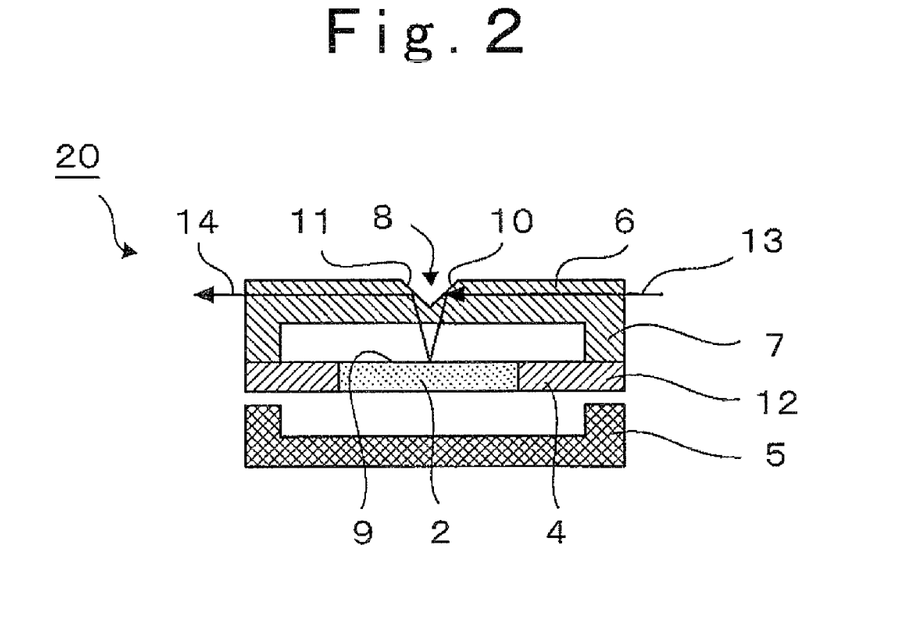
FIG. 2 is a longitudinal cross-sectional view showing an optical scanning device according to another embodiment of the present invention.

FIG. 2 is a longitudinal cross-sectional view of an optical scanning device 20 according to another embodiment of the present invention taken along an X axis. In the drawing, identical parts or parts having identical functions are given same symbols.

The constitution shown in FIG. 2 differs from the constitution shown in FIG. 1B with respect to a point that a V-shaped portion 8 formed on an upper surface of a reflection portion 6 forms a recessed portion. Further, the constitution shown in FIG. 2 differs from the constitution shown in FIG. 1B with respect to a point that the reflection portion 6 and a light transmitting portion 7 are integrally formed using a light transmitting material. This embodiment is substantially equal to the embodiment 1 with respect to other constitutions shown in FIG. 1. To be more specific, the reflection portion 6 is made of light transmitting glass. In the recessed portion which constitutes the V-shaped portion 8 formed on the upper surface of the reflection portion 6, a first reflection surface 10 and a second reflection surface 11 are formed. An angle at with the first reflection surface 10 and the second reflection surface 11 intersect with each other is an obtuse angle. This is because unless the intersecting angle is an obtuse angle, when an incident light enters parallel to an oscillating mirror surface, light reflected on the first reflection surface does not arrive at a radiation side by way of the oscillating mirror. Assuming a refractive index of glass as n, when the incident light enters horizontally or parallel to the oscillating mirror surface, provided that the above-mentioned intersecting angle is larger than θo defined by a formula (1), the incident optical flux 13 incident from the light transmitting portion 7 substantially horizontally is totally reflected on the first reflection surface 10.

$$1 = 2n \cdot \sin \theta o \qquad (1)$$

It is understood from the formula (1) that assuming a refractive index n of general glass as 1.46, the incident optical flux 13 is totally reflected when the intersecting angle is approximately 86.6° or more. In this manner, the total reflection condition is that the intersecting angle is 86.6° which is an acute angle or more and hence, the above formula (1) implies that the total reflection condition is satisfied automatically in the case that the intersecting angle is an obtuse angle.

In the same manner, a reflected light reflected from the oscillating mirror portion 2 is totally reflected on the second reflection surface 11, and is radiated as the scanned optical flux 14. That is, the incident optical flux 13 and the scanned optical flux 14 are positioned in the approximately same plane. The total reflection is utilized on the inclined surfaces of the V-shaped portion 8 and hence, it is unnecessary to form a reflection film formed of a metal film or the like on an upper surface of the reflection portion 6. However, to prevent the incidence of a noise light such as an external light, or to prevent the generation of flaws or the like on the surface of the V-shaped portion 8, it is desirable to form a light blocking layer or the like on the upper surface of the reflection portion 6. Further, it is desirable to fill the V-shaped portion 8 with other material so as to enhance strength of the reflection portion 6 thus making the reflection portion 6 hardly scratched by the intrusion of dusts or the like.

On the other hand, when the refractive index n is decreased due to a change of the light transmitting material, the intersecting angle is increased. This may bring about a case in which the above-mentioned total reflection condition is not satisfied. Accordingly, it is necessary to form a reflection film formed of a metal film or the like on an upper surface of the reflection portion 6. It is also preferable to apply the protection to the reflection surface in the same manner.

Figure 3:
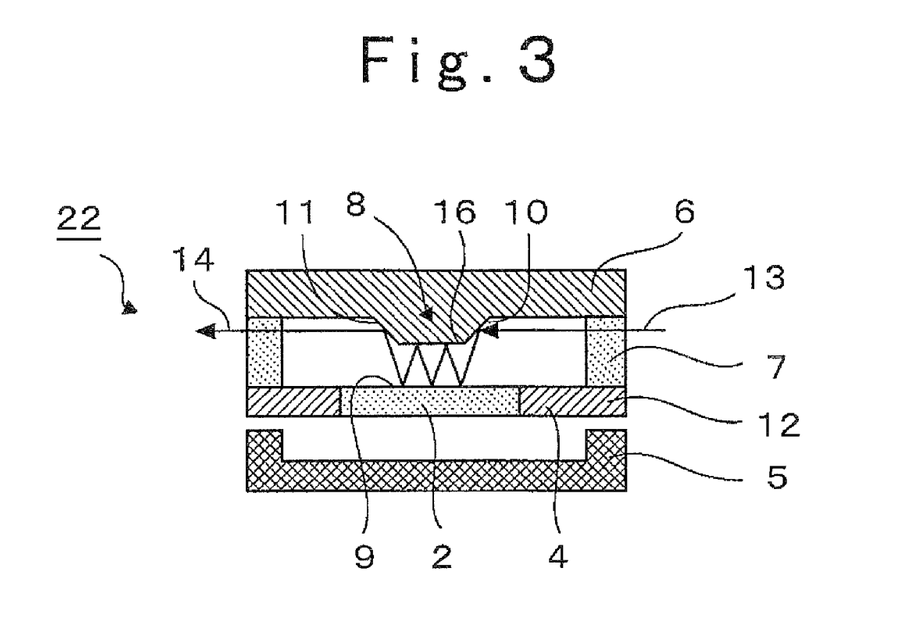
FIG. 3 is a longitudinal cross-sectional view showing an optical scanning device according to still another embodiment of the present invention.

FIG. 3 is a longitudinal cross-sectional view of an optical scanning device 22 according to another embodiment of the present invention taken along an X axis. In the drawing, identical parts or parts having identical functions are given same symbols.

The constitution shown in FIG. 3 differs from the constitution shown in FIG. 1B with respect to a point that a V-shaped portion 8 formed on a reflection portion 6 has an inverse trapezoidal shape. A reflection surface formed of a metal thin film made of aluminum, silver or the like is formed on inclined portions and a bottom surface portion of the V-shaped portion 8. An incident optical flux 13 which passes through a light transmitting portion 7 is reflected on a first reflection surface 10 which constitutes an inclined surface of the V-shaped portion 8, and is radiated to an oscillating mirror portion 2. The incident optical flux 13 is subject to multiple reflection between a reflection surface 9 of the oscillating mirror portion 2 and a top reflection surface 16, is reflected on a second reflection surface 11, and is radiated as a scanned optical flux 14. Due to such constitution, the scanned optical flux 14 can acquire a large scanning angle. The above-mentioned constitution may be modified such that the reflection portion 6 is formed using a light transmitting material, and the V-shaped portion 8 is formed of a recessed portion. Such modification can also enlarge a scanning angle of a scanned optical flux by performing multiple reflection of the incident optical flux. That is, a planar portion is formed on a bottom portion of the recessed portion, and a reflection surface is formed on at least the planar portion out of inclined portions and the planar portion. Due to such constitution, the incident optical flux 13 is subject to multiple reflection between the reflection surface 9 of the oscillating mirror portion 2 and the bottom surface portion of the V-shaped portion 8.

In the above-mentioned embodiments shown in FIG. 1 to FIG. 3, the explanation has been made with respect to a case in which a length of the V-shaped portion 8 is equal to a length of one side of the rectangular shaped reflection portion 6. However, the present invention is not limited to such a case. That is, it is sufficient for the first reflection surface 10 which reflects the incident optical flux 13 to have at least an optical flux diameter of the incident optical flux 13. Further, it may be sufficient for the second reflection surface 11 which reflects the reflected light scanned by the oscillating mirror portion 2 to have a width in the X axis direction orthogonal to the scanning direction larger than at least an optical flux diameter and a length in the scanning direction (Y axis direction) larger than at least a scanning range. That is, a length of the second reflection surface 11 in the Y axis direction orthogonal to the swing axis (X axis) direction of the oscillating mirror portion 2 is set larger than a width of the second reflection surface 11 in the X axis direction of the oscillating mirror portion 2.

Further, in the above-mentioned embodiments shown in FIG. 1 to FIG. 3, the explanation has been made with respect to the case in which the incident optical flux 13, the scanned optical flux 14 and the swing axis of the oscillating mirror portion 2 are arranged substantially parallel to each other. However, the present invention is not limited to such a case. That is, the swing axis of the oscillating mirror portion 2 may be arranged in the Y-axis direction orthogonal to the incident optical flux 13 and the scanned optical flux 14. In this case, the reflected light scanned by the oscillating mirror portion 2 falls substantially in an XZ plane (see FIG. 1), and the scanned optical flux 14 also falls substantially in the XZ plane. Accordingly, a length of the second reflection surface 11 in the Y axis direction orthogonal to the scanning direction is larger than at least the optical flux diameter, and a width of the second reflection surface 11 in the scanning direction (X axis direction) is larger than at least a scanning range. That is, compared to a case in which the swing axis of the oscillating mirror portion 2 is arranged substantially parallel to the incident optical flux 13 and the scanned optical flux 14, it is necessary to set a height (or a depth) of a peak portion relative to a base portion of the V-shaped portion 8 to a large value.

Figure 4:
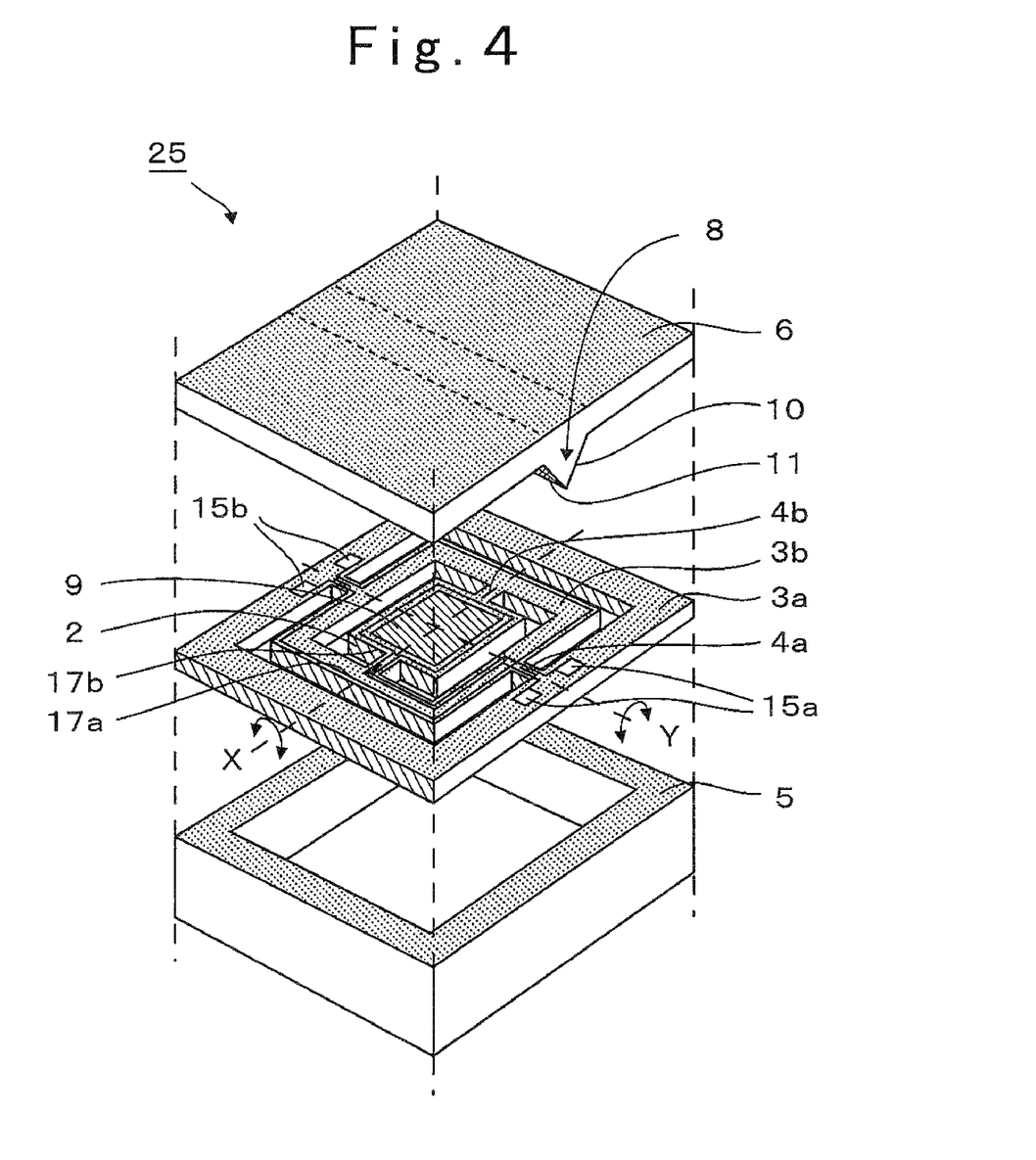
FIG. 4 is an exploded perspective view showing an optical scanning device according to still another embodiment of the present invention.

FIG. 4 is an exploded perspective view showing an optical scanning device 25 according to still another embodiment of the present invention. In the drawing, identical parts or parts having identical functions are given same symbols. The constitution of the optical scanning device 25 of this embodiment differs from the constitution of the optical scanning device 1 shown in FIG. 1A with respect to a point that an oscillating mirror portion 2 performs a biaxial swing motion.

In FIG. 4, the oscillating mirror portion 2 performs the biaxial swing motion. That is, the oscillating mirror portion 2 is pivotally supported on inner support portions 4b, and the inner support portions 4b are held by an inner frame portion 3b. Further, the inner frame portion 3b is pivotally supported by outer support portions 4a, and the outer support portions 4a are held by the outer frame portion 3a. Accordingly, the oscillating mirror portion 2 can perform an (X-axis) swing motion using the inner support portions 4b as a swing axis, and can perform a (Y-axis) swing motion using the outer support portions 4a as a swing axis. A reflection portion 6 is fixed to an upper portion of the outer frame portion 3a by way of light transmitting portions not shown in the drawing. Further, the outer frame portion 3a is fixed to an upper surface of a side wall of a holding portion 5 thus forming a swing space for the oscillating mirror portion 2. Further, the V-shaped portion 8 is formed on an oscillating mirror portion-2 side of the reflection portion 6. A reflection film made of metal is formed on inclined portions of the V-shaped portion 8. Due to such constitution, the inclined surfaces of the V-shaped portion 8 constitute a first reflection surface 10 which reflects an incident optical flux 13 and a second reflection surface 11 which radiates a scanned optical flux 14.

Further, a magnet not shown in the drawing is arranged on a lower portion of the holding portion 5. An inner planar coil 17b is formed on an outer periphery of the oscillating mirror portion 2, and a reflection surface 9 formed of a metal thin film is formed inside the inner planar coil 17b. an outer planar coil 17a is formed on a surface of the inner frame portion 3b. The inner planar coil 17b is connected with electrode terminals 15a via lines which are formed on the inner support portions 4b and the outer support portions 4a. The outer planar coil 17a is connected to the electrode terminal 15b via lines formed on the outer support portions 4a. By supplying an AC to the electrode terminals 15a, the oscillating mirror portion 2 performs a swing motion using the X axis as a swing axis due to a magnetic force generated by a magnetic field from a magnet not shown in the drawing which is arranged below the holding portion 5. By supplying an AC to the electrode terminals 15b, the oscillating mirror portion 2 performs a swing motion using the Y axis as a swing axis due to a magnetic force generated by a magnetic field from the magnet below the holding portion 5.

The incident optical flux incident from the X axis direction is reflected on the first reflection surface, and is radiated to the oscillating mirror portion 2. A reflected light from the reflection surface 9 of the oscillating mirror portion 2 is reflected on the second reflection surface 11, and is radiated as a scanned optical flux. Since the oscillating mirror portion 2 performs the biaxial swing motion, the scanned optical flux is also subject to two-dimensional scanning. Here, the reflection portion 6 may be formed using a transparent material, and the V-shaped portion 8 which is formed of a recessed portion may be formed on a surface of the reflection portion 6.

Figure 5:
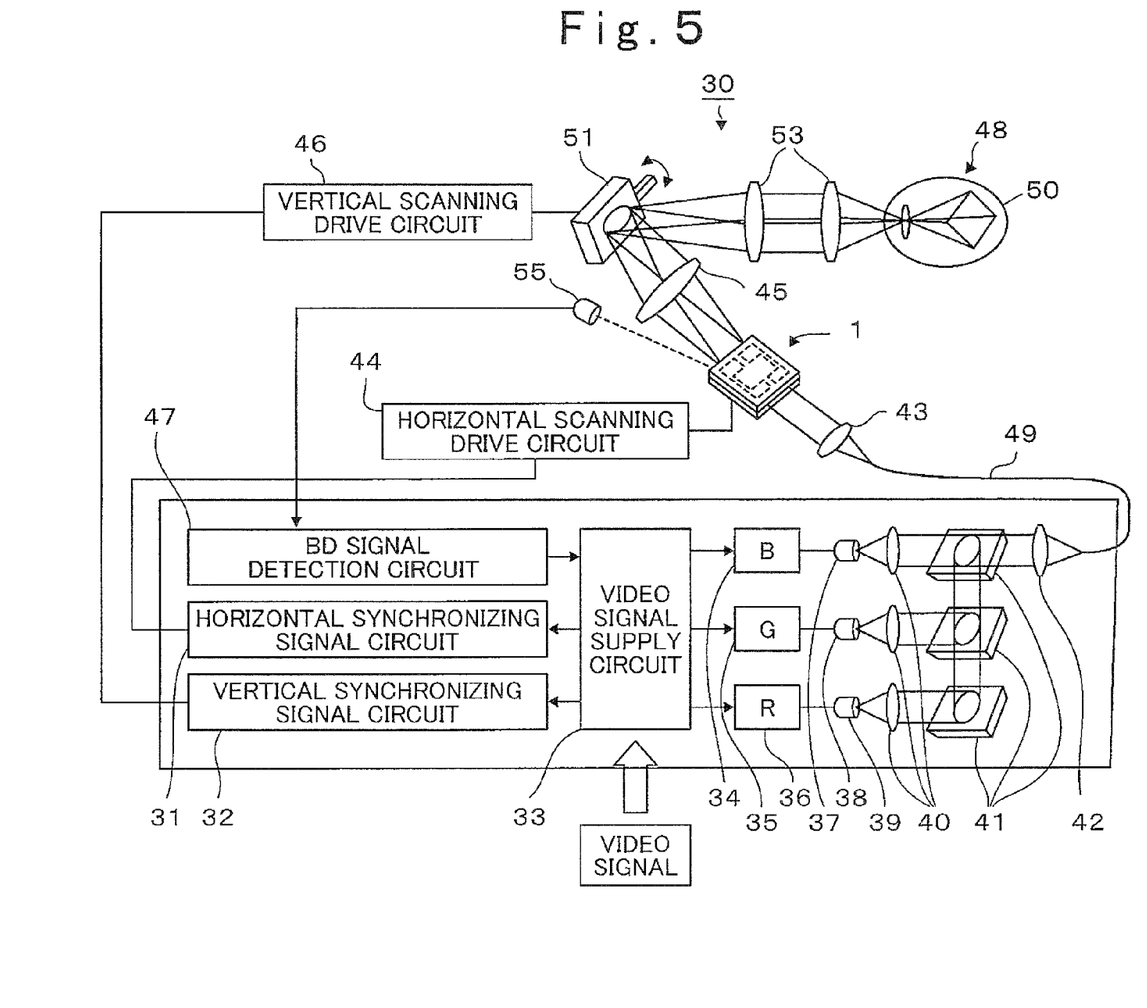
FIG. 5 is a block diagram showing a retinal scanning display according to an embodiment of the present invention.

FIG. 5 is a block diagram showing a retinal scanning display 30 which uses the optical scanning device 1, the optical scanning device 20 or the optical scanning device 22 described above. In the drawing, identical parts or parts having identical functions are given same symbols.

In FIG. 5, a retinal scanning display 30 directly forms an image on a retina 50 in an eye ball 48 of a viewer. Video lights which are radiated from a B laser 37 which emits a blue light, a G laser 38 which emits a green light, and an R laser 39 which emits a red light are converted into parallel lights due to a collimate optical system 40, and are synthesized by dichroic mirrors 41. The synthesized lights are converged by a focusing optical system 42 and are incident on the inside of an optical fiber 49. A video light radiated from the optical fiber 49 is radiated to the above-mentioned oscillating mirror portion 2 of the optical scanning device 1 explained in conjunction with FIG. 1 to FIG. 3. The oscillating mirror portion 2 is driven and swung by a horizontal scanning drive circuit 44, and performs horizontal scanning of the reflected light. The horizontally scanned video light is radiated to a Galvano mirror 51 via a relay optical system 45. The Galvano mirror 51 swings a mirror surface thereof by making use of a change of a magnetic field, and scans the reflected light in the vertical direction. The video light reflected on the Galvano mirror 51 is incident on the inside of a pupil of an eye ball 48 via the second relay optical system 53, and an image is formed on a retina 50.

A video signal supply circuit 33 receives inputting of video signals, and outputs video signals corresponding to blue (B), green (G) and red (R) to a B laser drive circuit 34, a G laser drive circuit 35 and an R laser drive circuit 36 respectively. The B laser 37 radiates laser beams of B color whose light intensity is modulated in response to a drive signal from the B laser drive circuit 34. The G laser 38 and the R laser 39 also radiate laser beams of respective colors whose light intensities are modulated in response to respective drive signals from the G laser drive circuit 35 and the R laser drive circuit 36.

The video signal supply circuit 33 outputs a synchronizing signal which is synchronized with the video signal to the horizontal scanning drive circuit 44 and the vertical scanning drive circuit 46. A horizontal synchronizing signal circuit 31 outputs a horizontal synchronizing signal to the horizontal scanning drive circuit 44, and a vertical synchronizing signal circuit 32 outputs a vertical synchronizing signal to the vertical scanning drive circuit 46. The horizontal scanning drive circuit 44 outputs a drive signal to the optical scanning device 1, and oscillates the oscillating mirror portion 2. Here, the oscillation is based on the resonance oscillations of the oscillating mirror portion 2. A photo sensor 55 receives a portion of light horizontally scanned by the horizontal scanning drive circuit 44, and converts the received light into an electric signal, and outputs the electric signal to a BD signal detection circuit 47. The BD signal detection circuit 47 detects timing of horizontal scanning, and outputs a timing signal to the video signal supply circuit 33, and the video signal supply circuit 33 accurately decides start timing of a video signal in response to the timing signal inputted from the video signal supply circuit 33.

In the above-mentioned retinal scanning display 30, the Galvano mirror 51 which swings vertical scanning due to a change of a magnetic field is used. The above-mentioned optical scanning device 1, 20 or 22 is applicable to such a Galvano mirror. In this case, frequency of vertical scanning is lowered to approximately 60 Hz, for example. Accordingly, swinging of the mirror portion is performed based on a torsional angle control using an electric signal without making use of resonance oscillation.

Further, in FIG. 5, the example in which the optical scanning device 1 is applied to the retinal scanning display 30 has been explained. By changing the second relay optical system 53 into a projection lens system and by replacing the eye ball 48 with a projection screen, a wall of a building or the like, it is possible to provide a projection-type optical scanning device (laser display). In the embodiment shown in FIG. 5, the display device of full color consisting of R, G and B is exemplified. However, it is possible to provide a large-screen-use optical scanning device by scanning laser beams of one color or two colors, for example. Further, with the use of the biaxial-swing-type optical scanning device 25 shown in FIG. 4, it is possible to provide a display device which performs a projection display of an image using one set of optical scanning device 25 without using the Galvano mirror 51.

Figure 6:
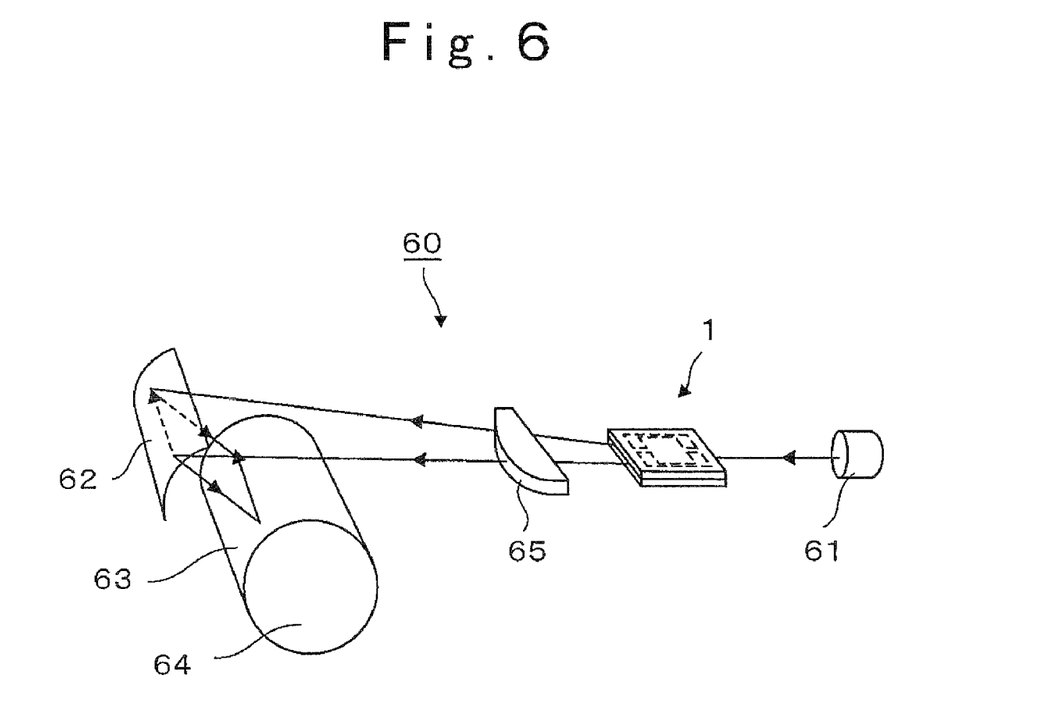
FIG. 6 is a block diagram showing a laser printer according to an embodiment of the present invention.

FIG. 6 is a schematic block diagram of a laser printer 60 which uses the optical scanning device 1, the optical scanning device 20 or the optical scanning device 22 described above. In the drawing, identical parts or parts having identical functions are given same symbols.

In FIG. 6, a laser beam source 61 which receives inputting of a modulation signal for forming an image radiates laser beams to the optical scanning device 1. The incident optical flux 13 which is incident on the first reflection surface 10 of the optical scanning device 1 is radiated to the oscillating mirror portion 2. A reflected light which is scanned and reflected by the oscillating mirror portion 2 is reflected on a second reflection surface, and is radiated to an fθ lens 65 as the scanned optical flux 14. The scanned optical flux corrected by the fθ lens 65 is reflected on a concave mirror 62 and is radiated to the photosensitive body 63 on a rotary drum 64 so that an electrostatic latent image is formed on the photosensitive body 63. Along with the rotation of the rotary drum 64, the electrostatic latent image is transferred to a copying paper not shown in the drawing. The above-mentioned optical scanning device 1 can use the optical scanning device explained in conjunction with FIG. 1 to FIG. 3. The above-mentioned fθ lens 65 is a lens which has a function of correcting a beam speed such that beam spots move at an equal speed on the photosensitive body 63.

One embodiment of the optical scanning device 25 used in the laser printer has been explained in conjunction with FIG. 6. However, an optical scanning device is used also in a one-dimensional or two-dimensional barcode reader or the like. In this case, the above-mentioned optical scanning device 1, 20, 22 which has been explained in conjunction with FIG. 1 to FIG. 3 can be used as such an optical scanning device.

FIG. 7A to FIG. 7G and FIG. 8A to FIG. 8E are explanatory views for explaining a manufacturing method of an optical scanning device according to an embodiment of the present invention, and particularly show a manufacturing method of the reflection portion 6. In these drawings, identical parts or parts having identical functions are given same symbols.

Figure 7A:
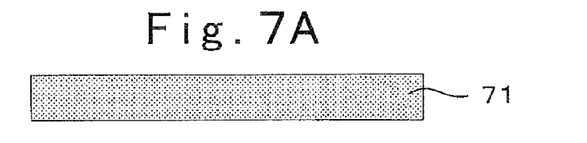
FIG. 7A to FIG. 7G are explanatory views showing a manufacturing method of an optical scanning device according to an embodiment of the present invention.

In FIG. 7A, a semiconductor substrate 71 is prepared. A silicon monocrystalline substrate is used as the semiconductor substrate 71. Hereinafter, the semiconductor substrate 71 is shown in cross section.

Figure 7B:
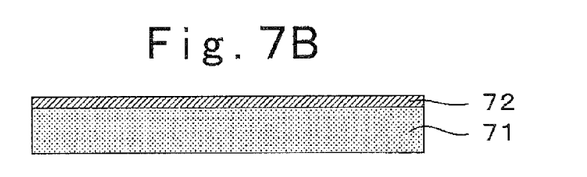

In FIG. 7B, an oxide film 72 is formed on the semiconductor substrate 71 as an etching mask. The semiconductor substrate 71 is heated at a temperature of approximately 1000° C. in oxygen atmosphere thus forming the oxide film 72. A nitride film or other thin films may be stacked on the semiconductor substrate 71 in place of the oxide film 72.

Figure 7C:
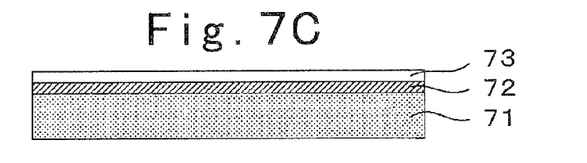
Figure 7D:
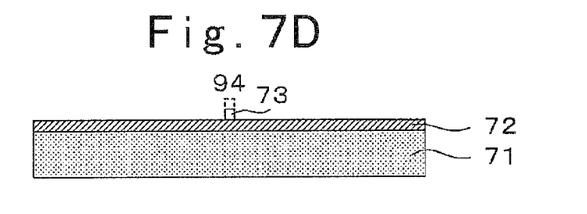

In FIG. 7C, a resist 73 is applied to the oxide film 72 by coating. Next, the resist 73 is exposed using a photo mask, and development of the resist 73 is performed. FIG. 7D shows a state after the resist 73 is developed, and the pattern of the resist 73 remains on the oxide film 72. This resist 73 defines a region where a V-shaped peak portion 94 is expected to be formed. Here, the resist 73 has the same cross-sectional shape in the vertical direction extending from a surface of drawing on which FIG. 7A to FIG. 7G are drawn.

Figure 7E:
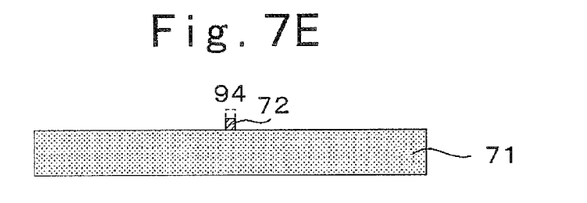

FIG. 7E shows a state in which the oxide film 72 is removed by etching using the resist 73 as a mask and, then, the resist 73 is removed. That is, FIG. 7E shows a state in which a pattern of the oxide film 72 is formed on the semiconductor substrate 71.

Figure 7F:
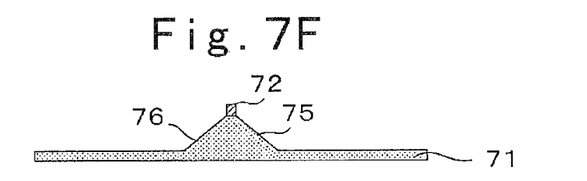
Figure 7G:
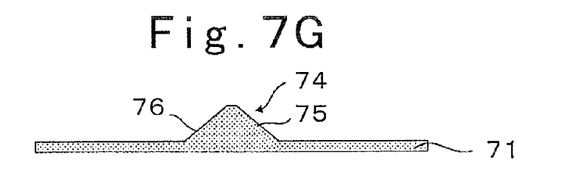

FIG. 7F shows a state in which anisotropic etching is applied to the semiconductor substrate 71 using the oxide film 72 as a mask. Due to anisotropic etching, the semiconductor substrate 71 is etched in an inverse V-shape in which the oxide film 72 forms the V-shaped peak portion 94, and inclined surfaces 75, 76 are formed. FIG. 7G shows a state in which the oxide film 72 is removed. When a silicon monocrystalline substrate is used as the semiconductor substrate, for example, KOH can be used as a wet etchant. It is possible to control an inclination angle of the inclined surfaces 75, 76 by properly selecting conditions such as a kind of the wet etchant, a mixing ratio of chemicals, concentration, temperature, a stirring condition, an electric field applying direction or a plane direction of the substrate.

Figure 8A:
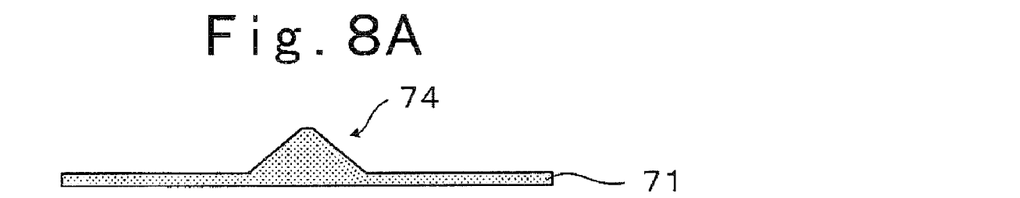
FIG. 8A to FIG. 8E are explanatory views showing the manufacturing method of an optical scanning device according to the embodiment of the present invention.
Figure 8B:
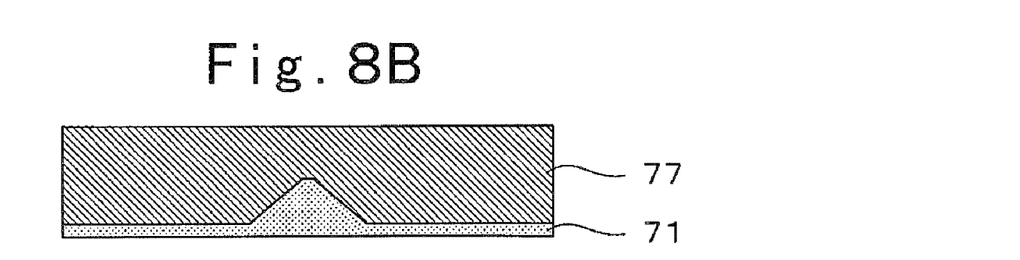
Figure 8C:
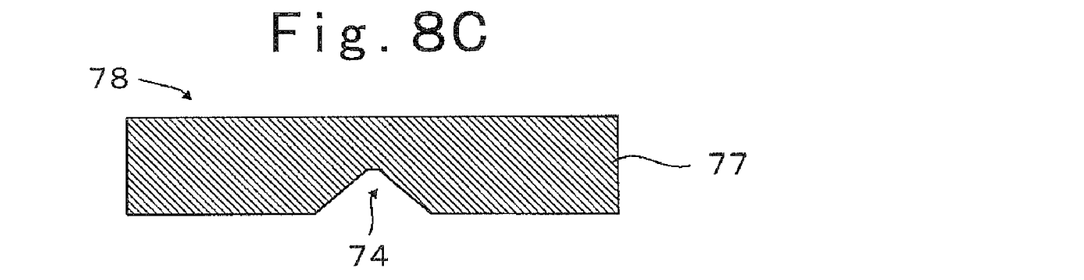
Figure 8D:
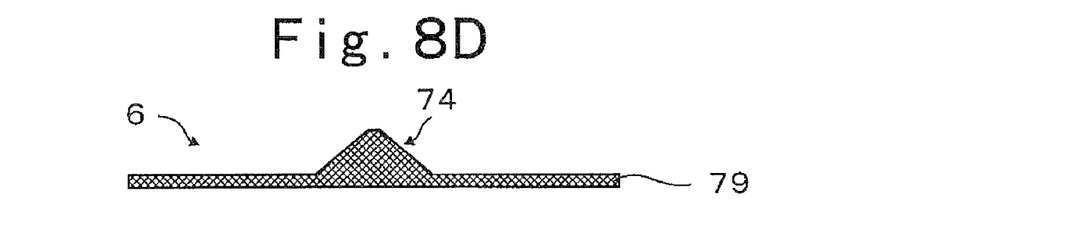

FIG. 8A shows a cross-sectional shape of the semiconductor substrate 71 obtained by a step shown in FIG. 7G. An approximately V-shaped portion 74 which constitutes a projection is formed on a center portion of the semiconductor substrate 71. FIG. 8B shows a state in which a first metal layer 77 is formed on the semiconductor substrate 71 by electrocasting. FIG. 8C shows a state in which a reverse mold 78 is formed by removing the semiconductor substrate 71 from the first metal layer 77 formed by electrocasting. FIG. 8D shows a state in which a second metal layer is stacked on the reverse mold 78 by electrocasting thus forming a reflection portion 6 formed of the second metal layer 79. By transferring the approximately V-shaped portion 74 from the reverse mold 78 in this manner, it is possible to manufacture a large number of reflection portions 6 having the same shape. When the approximately V-shaped portion 74 is formed using the semiconductor substrate, since the semiconductor substrate is formed of a single-crystal substrate and the semiconductor substrate per se is thin, the approximately V-shaped portion 74 is liable to crack. However, by forming the reverse mold 78 in the above-mentioned manner, this embodiment has an advantage that the reflection portions 6 having the same shape can be easily formed. Further, this embodiment has an advantage that even when the reverse mold 78 is worn or broken, the reverse mold 78 having the same shape can be easily formed from the semiconductor substrate 71 shown in FIG. 8A.

Figure 8E:
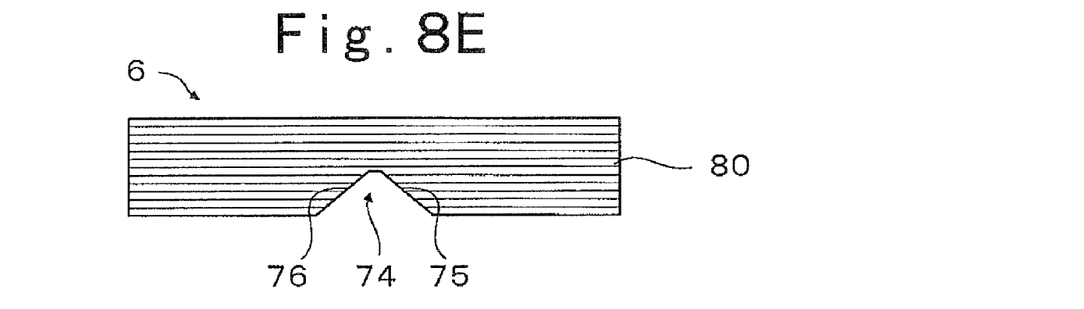

FIG. 8E shows a state in which the approximately V-shaped portion 74 is transferred to a light transmitting material 80 using the semiconductor substrate 71 shown in FIG. 8A or the reflection portion 6 formed of the second metal layer 79 shown in FIG. 8D as a mold, and the reflection portion 6 having a recessed portion which is constituted of a first inclined surface 75 and a second inclined surface 76 is formed. As the light transmitting material, an inorganic material such as glass or a high molecular material such as plastic can be used. In this manner, by using the semiconductor substrate 71 on which the approximately V-shaped portion 74 is formed or the retransferred second metal layer as the mold, the reflection portion 6 having the approximately V-shaped portion 74 of the same shape can be easily formed.

FIG. 9A to FIG. 9G are explanatory views for explaining another manufacturing method of an optical scanning device according to the embodiment of the present invention, and particularly show the manufacturing method of the reflection portion 6. In these drawings, identical parts or parts having identical functions are given same symbols.

Figure 9A:
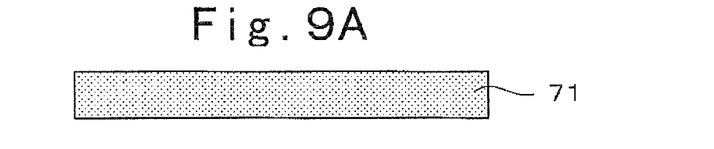
FIG. 9A to FIG. 9G are explanatory views showing a manufacturing method of an optical scanning device according to another embodiment of the present invention.
Figure 9B:
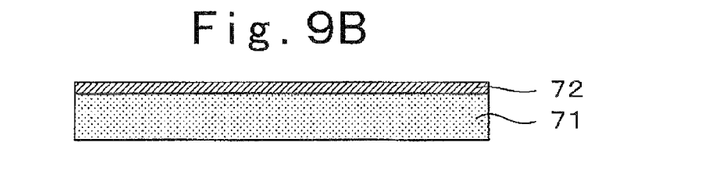
Figure 9C:
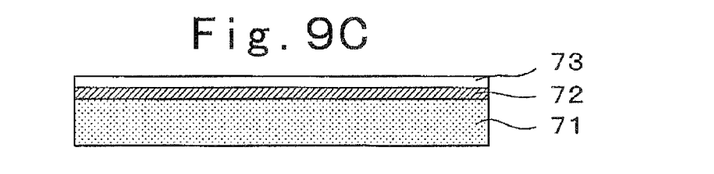
Figure 9D:
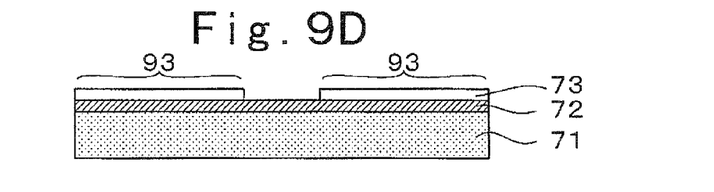
Figure 9E:
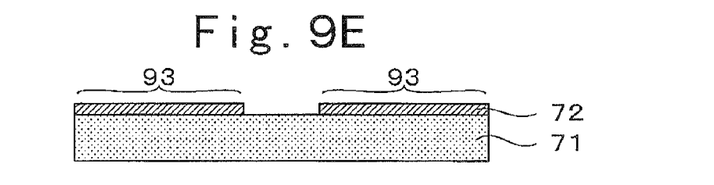

FIG. 9A to FIG. 9C show steps equal to the steps shown in FIG. 7A to 7C and hence, the explanation of the steps shown in FIG. 9A to 9C is omitted. FIG. 9D shows a state after the resist 73 is developed, and the pattern of the resist 73 remains on the oxide film 72. This resist 73 defines a region where a V-shaped skirt portion 93 is expected to be formed. Here, the resist 73 has the substantially same cross-sectional shape in the vertical direction extending from a surface of the drawing on which FIG. 9A to FIG. 9G are drawn. FIG. 9E shows a state in which the oxide film 72 is removed by etching using the resist 73 as a mask and, then, the resist 73 is removed. That is, FIG. 9E shows a state in which a pattern of the oxide film 72 is formed on the semiconductor substrate 71.

Figure 9F:
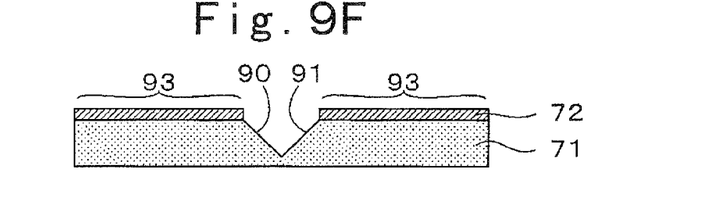
Figure 9G:
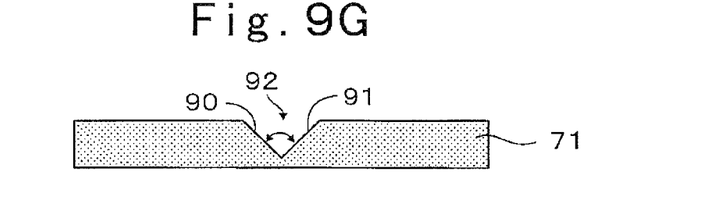

FIG. 9F shows a state in which anisotropic etching is applied to the semiconductor substrate 71 using the oxide film 72 as a mask. Due to anisotropic etching, the semiconductor substrate 71 is etched in a V-shape in which the oxide film 72 forms the V-shaped skirt portion 93, and inclined surfaces 90, 91 are formed. FIG. 9G shows a state in which the oxide film 72 is removed. When a silicon monocrystalline substrate is used as the semiconductor substrate 71, for example, KOH can be used as a wet etchant. It is possible to control an inclination angle of the inclined surfaces 90, 91 by properly selecting conditions such as a kind of the wet etchant, a mixing ratio of chemicals, concentration, temperature, a stirring condition, an electric field applying direction or a plane direction of the substrate.

In steps which follow the above-mentioned steps in FIG. 9A to FIG. 9G as explained in conjunction with FIG. 8, the reflection portion 6 having the convex or concave V-shaped portion 8 can be formed by forming a reverse mold by stacking a metal film on the semiconductor substrate 71 or using the semiconductor substrate 71 as a mold.

Next, a manufacturing method of the optical scanning device 1 is explained. The oscillating mirror portion 2, the support portions 4, the frame portion 3 and the beam portions 12 are integrally formed by applying the photolithography step and the etching step to the semiconductor substrate. Here, the oscillating mirror portion 2, the support portions 4, the frame portion 3 and the beam portions 12 may be also integrally formed using a metal plate or an inorganic material such as glass in place of the semiconductor substrate. Next, the frame portion 3 is fixed to the holding portion 5 by anodic bonding. Next, when a piezoelectric body is used as a drive force for generating the oscillations of the oscillating mirror portion 2, the piezoelectric body is fixed to the beam portion 12 and the frame portion 3 by bonding in a striding manner. Next, the light transmitting portion 7 is fixed to the frame portion 3. Then, the reflection portion 6 which is formed by the manufacturing method explained in conjunction with FIG. 7 and FIG. 8 is mounted on the light transmitting portion 7 thus completing the optical scanning device.

In the above-mentioned embodiment, the explanation has been made with respect to a case in which the V-shaped portion 8 and the approximately V-shaped portion 74 mainly have a triangular shape. However, the present invention also includes a trapezoidal shape which is formed by flattening an apex of a triangle as the shape of the V-shaped portion 8 and the approximately V-shaped portion 74. Accordingly, in the above-mentioned explanation, the approximately V-shape includes a V-shape, an inverse V-shape, a trapezoidal shape, and an inverse trapezoidal shape. Further, the triangular or the trapezoidal shape also includes a shape whose apex is rounded. Further, in the above-mentioned explanation, the first inclined surface 75 and the second inclined surface 76 are directly used as the first reflection surface and the second reflection surface, or the first reflection surface and the second reflection surface may be formed by forming a reflection film made of aluminum, silver or the like on these inclined surfaces. That is, it is sufficient that a convex portion or a concave portion is formed on the reflection portion 6, an inclined surface is formed on side portions of the convex portion or the concave portion, an incident optical flux is reflected on the inclined surface and is radiated to the reflection surface 9 of the oscillating mirror portion 2, and a reflected light reflected from the reflection surface 9 is reflected, and the reflected light is radiated as a scanned optical flux.

It is needless to say that the second reflection surface 11 is configured to reflect the scan light generated by swinging of the oscillating mirror portion 2, and the light transmitting portion 7 is configured to allow the scan light reflected on the reflection surface 11 to pass therethrough.

What is claimed is:

1. An optical scanning device comprising:
 an oscillating mirror portion which has an oscillatable reflection surface;
 a frame portion which holds the oscillating mirror portion; and
 a reflection portion made of a light transmitting material which is arranged at a position where the reflection portion faces the reflection surface of the oscillating mirror portion, the reflection portion having a first reflection surface and a second reflection surface which form approximately V-shaped inclined surfaces, wherein the first reflection surface and the second reflection surface are formed on an approximately V-shape concave portion which is formed on a first side of the reflection portion, the first side being opposite to a second side of the reflection portion which faces the oscillating mirror portion, the first reflection surface is configured to reflect an incident optical flux which enters the inside of the reflection portion toward the oscillating mirror portion, and the second reflection surface is configured to receive a reflected light which is formed by reflection of the incident optical flux on the oscillating mirror portion and enters the inside of the reflection portion and to radiate the reflected light as a scanned optical flux, whereby the incident optical flux is converted into the scanned optical flux by oscillations of the reflection surface.

2. An optical scanning device according to claim 1, wherein the incident optical flux and the scanned optical flux are positioned in an approximately same plane.

3. An optical scanning device according to claim 1, wherein a direction of an oscillation axis of the oscillating mirror portion is substantially parallel to a direction of the incident optical flux, and the scanned optical flux is radiated in a direction which includes at least the direction that the incident optical flux is incident.

4. An optical scanning device according to claim 1, wherein the frame portion and the reflection portion are integrally formed.

5. An optical scanning device according to claim 1, wherein at least one of the first reflection surface and the second reflection surface is a reflection surface which allows total reflection.

6. A retinal scanning display which includes an optical scanning device and is configured to project and display an image on a retina by scanning an optical flux modulated in response to an image signal by the optical scanning device, wherein the optical scanning device includes:

an oscillating mirror portion which has an oscillatable reflection surface;

a frame portion which holds the oscillating mirror portion; and a reflection portion made of a light transmitting material which is arranged at a position where the reflection portion faces the reflection surface of the oscillating mirror portion, the reflection portion having a first reflection surface and a second reflection surface which form approximately V-shaped inclined surfaces, wherein the first reflection surface and the second reflection surface are formed on an approximately V-shape concave portion which is formed on a first side of the reflection portion, the first side being opposite to a second side of the reflection portion which faces the oscillating mirror portion, the first reflection surface is configured to reflect an incident optical flux which enters the inside of the reflection portion toward the oscillating mirror portion, and the second reflection surface is configured to receive a reflected light which is formed by reflection of the incident optical flux on the oscillating mirror portion and enters the inside of the reflection portion and to radiate the reflected light as a scanned optical flux, whereby the incident optical flux is converted into the scanned optical flux by oscillations of the reflection surface.

7. A manufacturing method of an optical scanning device which includes: an oscillating mirror portion which has an oscillatable reflection surface; a frame portion which holds the oscillating mirror portion; and a reflection portion which is arranged at a position where the reflection portion faces the reflection surface of the oscillating mirror portion, the reflection portion having a first reflection surface and a second reflection surface which form approximately V-shaped inclined surfaces, wherein the manufacturing method of an optical scanning device comprises a step of forming the reflection portion, and the step of forming the reflection portion comprises the steps of:

applying a resist to a semiconductor substrate;

leaving the resist in a region where a peak portion or a skirt portion of the approximately V-shaped inclined surfaces is expected to be formed;

forming the inclined surfaces in which the resist forms the peak portion or the skirt portion by applying anisotropic etching to the semiconductor substrate; and removing the resist.

8. A manufacturing method of an optical scanning device according to claim 7, wherein the semiconductor substrate is fixed to the frame portion with the inclined surfaces directed toward a side where the oscillating mirror portion is positioned.

9. A manufacturing method of an optical scanning device according to claim 7, further comprising the steps of:

forming a first metal layer on the semiconductor substrate on which the inclined surfaces are formed by electrocasting; and forming a reverse mold formed of the first metal layer by removing the semiconductor substrate from the first metal layer.

10. A manufacturing method of an optical scanning device according to claim 9, further comprising the steps of:

forming a second metal layer on the reverse mold by electrocasting; and retransferring the inclined surfaces to the second metal layer by removing the reverse mold from the second metal layer.

11. A manufacturing method of an optical scanning device according to claim 9, wherein the second metal layer is fixed to the frame portion with the retransferred inclined surfaces directed toward a side where the oscillating mirror portion is positioned.

12. A manufacturing method of an optical scanning device according to claim 7, further comprising the steps of:

transferring the inclined surfaces to a light transmitting member using the semiconductor substrate or the second metal layer on which the inclined surfaces are formed as a mold; and fixing the light transmitting member to the frame portion with the transferred inclined surfaces directed toward a side opposite to a side where the oscillating mirror portion is positioned.

* * * * *